United States Patent [19]

Stern

[11] 4,045,885
[45] Sept. 6, 1977

[54] PLANETARIUM WITH STAR IDENTIFYING MEANS

[76] Inventor: Philip Stern, 3800-21st Ave. North, St. Petersburg, Fla. 33713

[21] Appl. No.: 710,266

[22] Filed: July 30, 1976

[51] Int. Cl.² ............................................. G09B 27/00
[52] U.S. Cl. .................................................... 35/42.5
[58] Field of Search ................................. 35/42.5, 14

[56] References Cited
U.S. PATENT DOCUMENTS

| | | | |
|---|---|---|---|
| 2,168,799 | 8/1939 | Korkosz et al. | 35/42.5 |
| 3,228,120 | 1/1966 | Farrell | 35/14 |
| 3,552,037 | 1/1971 | Stern | 35/42.5 |

Primary Examiner—William H. Grieb
Attorney, Agent, or Firm—Robert Henderson

[57] ABSTRACT

A pin hole type star globe of a planetarium is provided with star identifying means for intermittently interrupting light projected through a pin hole of the star globe to form a star image on a viewing screen, thereby causing a perceptible, identifying blinking of said star image. The star identifying means includes an occluding arm which may be caused to swing back and forth into and out of interference with reference to the projected light; such swinging being caused by electrical, radio frequency means, controlled by step operating switching means.

9 Claims, 7 Drawing Figures

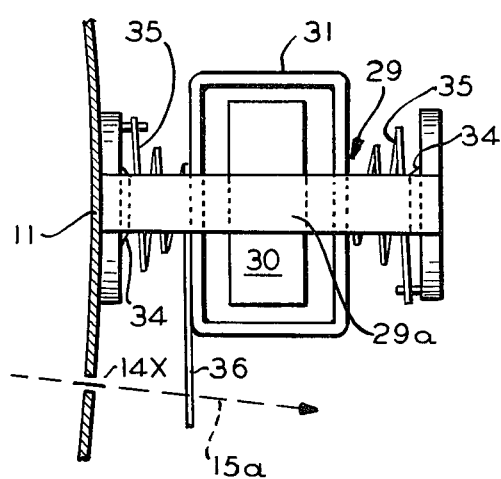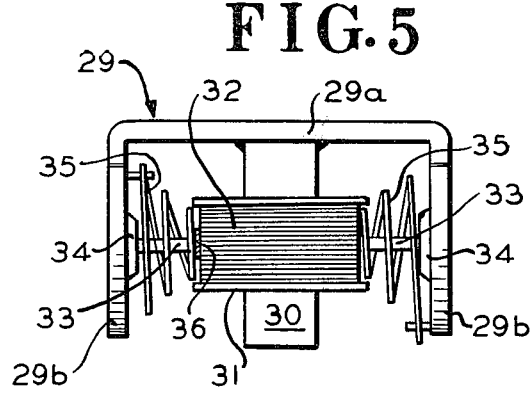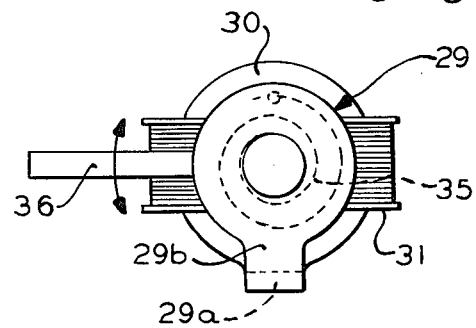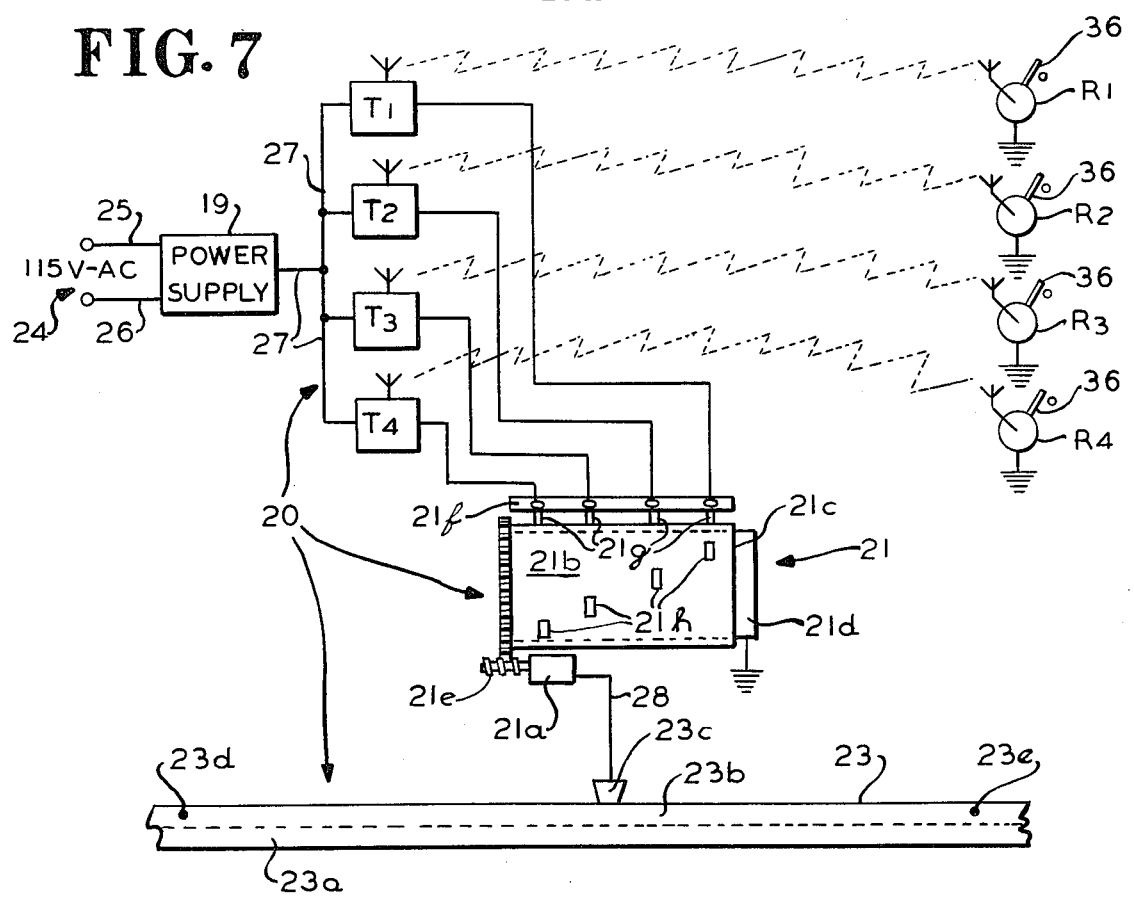

PLANETARIUM WITH STAR IDENTIFYING MEANS

BACKGROUND OF THE INVENTION

Star image identification means in planetariums have hitherto involved projection onto the viewing screen of an arrow image pointing to the star image to be identified, or by the projection of a circle image so positioned as to encircle the star image to be identified.

Such prior identification means require complex electrical circuits, often with contact slip-rings as well as mirrors reflecting light rays to produce identification images upon a viewing screen in proximity to the star images to be identified.

In such prior arrangements, the means for projecting the arrow or circle have been additional to the means for projecting the star image and have necessarily been located laterally of the beam of light which projects the star image. Such prior arrangements are fraught with great difficulty both in providing the necessarily additional projecting means and in the need for complex mechanisms for spotting the arrow or circle on the screen in proper relation to the star image to be identified.

All references in this specification and in the accompanying claims to a "star" or a "star image" should be understood to comprehend, also, a planet or a planet image.

THE PRINCIPAL OBJECTS OF THIS INVENTION

A primary object of this invention is greatly to simplify the means, in a planetarium, for identifying a star image on a viewing screen.

An important object, also, is to provide star identifying means operative directly upon the beam of light projected to form a given star image rather than to be operative laterally with respect to that beam.

Another important object is to provide controllable, light interfering means for intermittently occluding a projected star image forming light beam to cause the projected star image to blink.

Another important object is to provide means largely employing radio frequency transmitting and receiving means instead of using complex wiring to control the light interfering means, thereby greatly simplifying the planetarium to realize very substantial economies in manufacturing it.

Another important object is to utilize magnetic tape or the like for so controlling both a lecture and the light interfering means as to coordinate the blinking of a star image on the screen with the oral reference to the star of that image in the lecture.

Other objects and advantages of this invention will be apparent from the present disclosure. The mentioned as well as the apparent objects and advantages may be achieved by means as set forth in the foregoing "Abstract of the Disclosure" and as more specifically referred to in the following "Detailed Specification."

BRIEF DESCRIPTION OF THE DRAWINGS

In the accompanying drawings:

FIGS. 4, 5, and 6 are still further, but equally, enlarged views of one of the blinker devices; FIG. 4 being a side view of said device, FIG. 5 being another side view as of 90° from the view of FIG. 4, and FIG. 6 being a top plan view of the device.

FIG. 7 is a diagrammatic view of programmed means coacting with radio transmitters to control, through related radio receivers, the operation of plural blinker devices, each of which is tuned for radio control by a different one of said transmitters.

DETAILED SPECIFICATION

Figure 1:
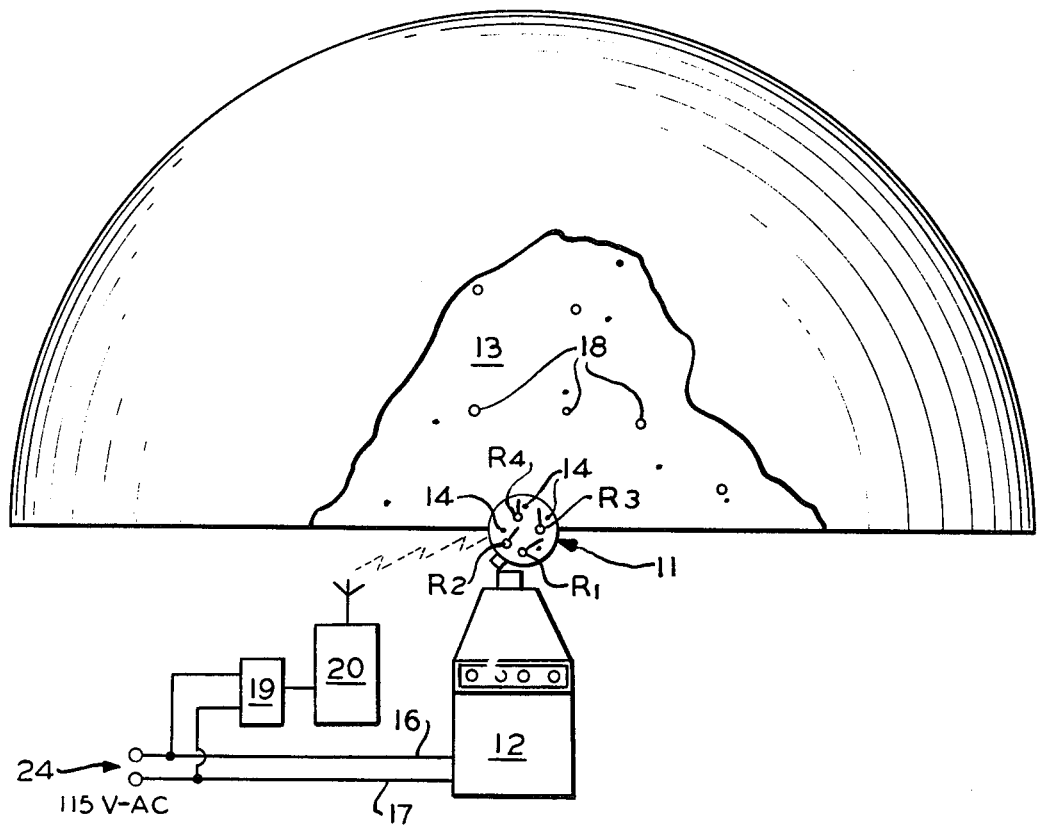
FIG. 1 is a largely diagrammatic illustration, showing the operative relationship of the main components of an improved planetarium according to this invention.
Figure 2:
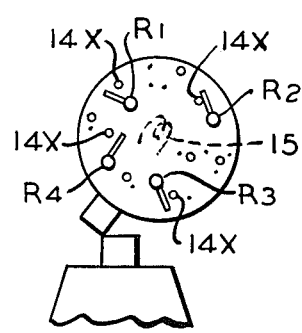
FIG. 2 is an enlarged view of a star globe of the planetarium with indications of the positioning thereon of four blinker devices, each in operative association with a related light emitting pinhole of the star globe.
Figure 3:
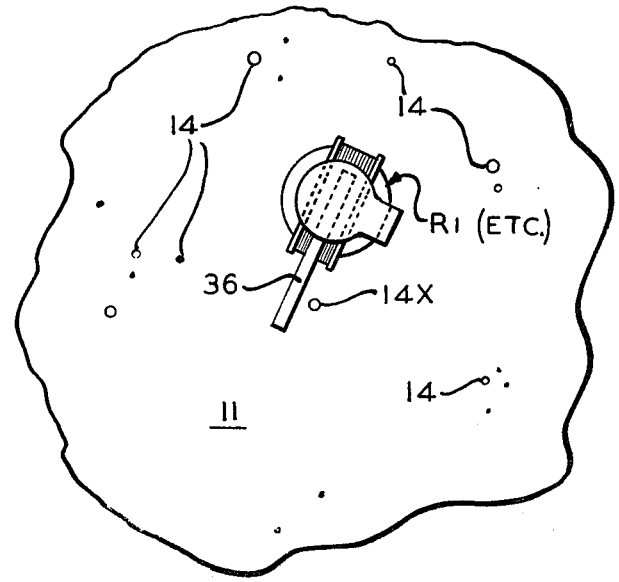
FIG. 3 is a further enlarged top plan view of one of the blinker devices as fixedly positioned upon a fragmentally shown surface area of the star globe.

Referring to FIG. 1 of the drawings, a hollow star globe 11 is supported upon a console 12 for rotation, by a suitable mechanism (not shown), about an angularly inclined axis. The star globe is positioned with its center located approximately equidistantly from all inside surface areas of a hemispherical viewing screen 13.

The star globe 11 is formed with plural pin holes 14 and, suitably supported at its center, is an electric lamp 15, energized through suitable connections to the console 12 which, in turn, is connected through wires 16 and 17 to a source 24 of alternating current, indicated as of about 115 volts.

The pin holes 14 are so located in the star globe 11 as to project star images 18 upon the screen 13 in the relationship in which the stars are visible in the firmament. Also, the pin holes may differ slightly in size to show the star images on the screen as appearing of different sizes.

Although the preceding details in this specification are well known to those having some familiarity with planetariums, the foregoing recitals should facilitate an understanding of the present invention.

THE PRINCIPAL COMPONENTS OF THIS INVENTION

The principal components of the star identifying means of this invention are diagrammed in FIG. 7 as comprising a power supply 19, a radio frequency transmitting assembly 20, shown as including four radio transmitters T1, T2, T3, and T4, a switching device 21, and a motor 21a, suitably geared by gearing 21e to said switching device for operating the latter, and a suitably driven magnetic tape 23. The tape 23 is provided with at least two tracks, 23a for producing an audible lecture, and 23b for controlling the motor 21a to cause step by step operation of the switching device 21. The invention's principal components also include four radio receivers R1, R2, R3, and R4, which include means enabling them to serve as light interrupters. In operation, said switching device 21 controls the transmitters T1, T2, T3, T4 to enable one or more of the latter to operate one or more of the receivers R1 etc. by radio.

The power supply 19 should be of such character as to receive 115 volt alternating current from a power source 24 by way of wires 25 and 26, and to transform the thus received current into direct current, this transformed current being conducted by wire 27 to the transmitters T1, T2, T3, and T4.

THE RADIO TRANSMITTERS

There should be as many individual transmitters T1, T2, etc. as the number of stars to be identified on the screen 13. For convenience of description, only four such transmitters are shown in the drawing. These radio transmitters may be of any suitable known components and circuitry for their purpose. Each of the transmitters is fixedly tuned to transmit on a different wave length. They are in the nature of oscillators transmitting in pulses of from two to five times per second. Each of said transmitters is in a separate circuit and they are controlled for individual and/or joint operation by the switching device 21 in a manner now to be described.

THE SWITCHING DEVICE

The illustrated switching device 21 (FIG. 7) is a preferred one of several types of switching devices which may be employed. The device 21, diagrammatically shown as a rectangle, consists of a cylindrical drum 21b having a relatively thin outer shell 21c of dielectrical material and an inner shell 21d of electrically conductive material snugly fitted within the outer shell, said drum being suitably supported by bearings (not shown) for rotation about its principal axis. The drum 21b is step by step rotated by the motor 21a, through worm gearing 21e, in a manner hereinafter explained.

Suitably supported fixedly, close to the drum 21b, is a contact support strip 21f, carrying wiping contactors 21g, spaced along said strip in wiping engagement with the drum's outer shell 21c. Along the several circular lines of such wiping engagement, the shell 21c is formed with perforations 21h which, as the drum is rotated, enable the contactors 21g to engage the underlying inner shell 21d through said perforations, to complete a circuit or circuits through the latter shell to the ground.

It may be seen that the contactors 21g are separately connected by wiring to the several transmitters T1, etc; consequently, as circuits are established through perforations 21h through different ones of said contactors, different transmitters will be energized for transmitting energy to relatedly tuned receivers-interrupters R1, etc. It is also to be noted that, although the perforations 21h are shown for convenience of illustration only on one side of the outer shell 21c, those perforations may be spaced about the entire circumference of said shell. Where numerous star identifications are to be made during a lecture, the perforations 21h may be quite closely spaced circumferentially of the shell 21c to correspond to rather short step movements of the drum 21 about its axis.

The tape 23 coacts with a sensor 23c which separately conveys a lecture taped on the tape's track 23a to audibly reproduce that lecture by well known means (not shown), and conveys, from tape track 23b, motor control signals represented in the drawing by dots 23d and 23e on the latter track. The motor control signals picked up from the track 23b by the sensor 23c are carried to the motor 21a by wire 28. Said motor control signals are differentiated to control starting and stopping of the motor 21a. The power supply to said motor is not shown, as any conventional power supply means for said motor may be employed.

THE RADIO CONTROLLED LIGHT INTERRUPTERS

The radio receiving light interrupters R1, R2, R3, and R4 are highly miniaturized, and each is fixed by magnetism or adhesion to the surface of the star globe 11 in operative proximity to a pin hole 14x provided for projecting a light beam 15a therethrough (FIG. 4) to form a star image 18 on the viewing screen 13.

The light interrupters R1, R2, R3, R4 are alike in structure, but are differently tuned to receive radio frequency energy only from transmitters T1, T2, T3, and T4 respectively. As to structure, a preferred form of light interrupter is illustrated in FIGS. 4, 5, and 6.

Referring to FIGS. 4, 5, and 6, the illustrated light interrupter comprises a rigid, U-shaped yoke 29, within which a solid, cylindrical magnet 30 is suitably fixed by being welded to a central portion 29a of said yoke. On a suitable rectangular frame 31, is wound a coil of wire 32. Said frame is provided with oppositely extending, coaxial trunnions 33, the extremities of which are rotatively seated in bearing seats 34 which are fixed to the inside faces of the opposed legs 29b of said yoke. The coil 32 is suitably connected to its related receiver. Around each of said trunnions extends a coilspring 35, the inner end of which is fixed to the frame 31, and the outer end of which is fixed to the adjacent leg 29b of the yoke 29.

Fixed to the frame 31, is an occluding arm 36 which projects from said frame into close proximity with the course of a beam light 15, emanating from a related pin hole 14x.

The indicated fixation of the springs 35 is such that they are both relaxed when the frame 31 with its associated coil 32 and occluding arm 36 are in a neutral position as when said coil carries no current. When the coil 32 becomes energized by pulsing radio frequency energy from its related receiver and transmitter (T1, etc.), said coil reacts inductively with the magnet 30 to swing arcuately with its related occluding arm 36 as indicated by the arcuate arrow appearing in FIG. 6. Such swinging is caused by the pulsing of the energy emitted from the related transmitter. As each pulse becomes effective in the coil 32, said coil reacts with the magnet 30 to swing the arm 36 into light occluding position over the related pin hole 14x, thereby momentarily obscuring a pre-existing star image which had been visible on the screen 13. As each pulse of energy terminates, the the coil 32 goes dead so that said coil's coaction with the magnet 30 also terminates, permitting the springs 35 to move the arm 36 back to non-occluding position.

OPERATION OF THE DISCLOSED STAR IDENTIFYING MEANS

As illustrated in FIG. 7, none of the switch connectors 21g is engaged through any of the perforations 21h, so that none of the transmitters T1, etc. is activated for transmission. The tape is started to run, starting delivery of a lecture. At a predetermined point in the lecture, when a star being referred to is to be identified, a signal dot 23d on the tape's track 23b is picked up by the sensor 23c which, through wire 28, starts motor 21a running, thereby turning the drum 21b. As the tape 23 runs, another motor control signal, dot 23e, on the track 23b, stops the motor 21a to discontinue turning of the drum 21b, leaving the rightward contactor 21g closing a circuit through transmitter T1 and through the drum's inner shell 21d to ground, thereby providing a sustained flow of pulsing energy from the transmitter T1 to its related receiver R1. The pulsing energy in the latter receiver causes its occluding arm 36 to swing back and forth to maintain blinking, as long as desired, of the star image controlled by the latter receiver.

The pulsing radio frequency energy is transmitted from transmitter T1 to receiver R1 to which it is paired by tuning, this transmission being indicated by zig zag broken lines in FIG. 7. That figure also indicates the tuned pairing of T2 with R2, T3 with R3, and T4 with R4.

The radio frequency energy is preferably received at a related receiver in pulses of from two to five times per second, causing similarly timed back and forth movement of the occluding arm 36 of receiver R1 to intermittently occlude the light emanating from a related pin hole 14x in the star globe 11, thereby causing blinking of the star image 18 projected upon the screen 13 through said pin hole.

As the lecture progresses, other motor control signals of the tape's track 23b may function, in the manner explained, to start and stop turning of the drum 21b. The renewed turning of the drum will cause another or several contactors 21g to close another circuit or circuits according to the locations of the perforations 21h in the drum's shell 21c. Such renewed turning of the drum may, for example, enable another contactor 21g to activate transmitter T2 to cause its paired receiver R2, to initiate blinking of a star image controlled by the latter receiver. Again, the motor control signals on the tape's track 23b function in the manner already explained.

If, at some time during a given lecture, no star image blinking is desired, the motor control signals will be so located on the tape's track 23b that the turning of the drum 21b will be suspended at a position where none of the contactors 21g will engage with any perforation 21h in the drum's outer shell 21c. On the other hand, if two or more star images are to blink concurrently, the drum's rotation will be suspended while two or more of the contactors 21g are in contact with the drum's inner shell 21d through related perforations 21h in the drum's said outer shell.

GENERAL COMMENTS

Although this invention is disclosed herein for blinking four star images, it may be adapted for blinking more sky object images and combinations thereof by providing more pairs of transmitters and receivers and by suitably increasing the number of contactors and perforations aligned therewith in the drum's outer shell.

Also, various other switching means may be employed to perform the switching functions disclosed herein. Various other radio receiving devices are known and available for use to cooperate to bring about the desired blinking of star images, and no transmitting means has been detailed herein as various types of transmitters are known and available for use in the manner indicated herein.

Inasmuch as the desired star image blinking effect may be achieved within this invention by some instrumentalities other than those detailed herein, this invention should not be limited except as clearly indicated in the accompanying claims.

I claim:

1. In a planetarium (according to claim 1,) having a light emitting star globe with a light source therein and having plural pin holes therein through which light from said source is projected, and a screen upon which such projected light forms separate star images approximately in relationships as stars represented by said images appear visible in the firmament; light occluding means for providing intermittent occlusion of a beam of said light which is projected to form a star image, to cause blinking of said star image, and control means for initiating and terminating said intermittent occlusion; said light occluding means comprising an interrupter unit fixed to a generally spherical wall defining said star globe; said unit including an occluding arm, and an actuator, responsive to said control means, for causing reciprocation of said arm back and forth intermittently into and from the path of light projected from said light source.

2. In a planetarium according to claim 1, said control means comprising a radio frequency transmitting oscillator adapted to operate intermittently; switching means connected to said oscillator for switching the latter on and off; said interrupter unit including a radio frequency receiver; said occluding arm being responsive to radio frequency energy received by said receiver from said oscillator to move said arm in one direction to a position occluding said path of light; and said interrupter unit including spring means biasing said arm into movement in an opposite direction to a non-occluding position.

3. In a planetarium according to claim 1, said interrupter unit being fixed to the outer surface of said spherical wall of the star globe.

4. In a planetarium according to claim 2, said control means further including a moving magnetic tape and a sensing element coacting with said tape to sense programming variations therein; and switch operating means, connected between said switching means and said sensing element, for operating said switching means in accordance with programming variations in the tape.

5. In a planetarium according to claim 2, said control means comprising a plurality of said oscillators, interconnected in parallel; said switching means including plural contact elements, separately connected to said oscillators to individually activate the latter; and said control means separately coacting with said contact elements to render said oscillators separately operative.

6. In a planetarium according to claim 4, said tape having a lecture generating track and a programming track, said two tracks having variations therein providing coordination between a lecture and the identifying of a star mentioned in the lecture.

7. In a planetarium according to claim 1, said actuator of the interrupter unit comprising a radio receiver, a current indicating device connected to said receiver and including a pivotal coil to which said occluding arm is fixed; said coil being adapted to swing back and forth with said arm in response to energy intermittently received by said receiver.

8. In a planetarium having a light emitting star globe with a light source therein and plural pin holes therein through which light from said source is projected, and a screen upon which the light projected through said pin holes forms separate star images on said screen approximately in their apparent visual relationships as the stars appear in the firmament; plural light occluding means separately fixed upon said star globe adjacent to related pin holes from which projected light engenders images, on said screen, of selected stars to be mentioned in a lecture, each of said occluding means including an occluding arm and radio frequency reception means adapted to swing said arm into and from light occluding relationship to light issuing from its related pin hole; a power supply providing relatively low voltage direct current; plural radio transmitters connected in parallel to said power supply and each adapted to transmit radio frequency energy intermittently at relatively low intervals of the order of two to five times per second; a multi-contact switching device controlling separate circuits through said plural transmitters; operating means for operating said switching device to selectively close said circuits to selectively activate said transmitters; a magnetic tape having a first track, controlling reproduction of a lecture, and a second track, having programming variations therein coordinated with said lecture, and electrically coacting with and controlling operation of said operating means to control the selective activation of one of said transmitters; said reception means of each occluding means being paired, by similar tuning, with a different one of said transmitters, whereby selective activation of each transmitter activates the occluding means paired with the activated transmitter.

9. In a planetarium according to claim 8, said switching device comprising a rotatable drum having plural contacts separately coacting with each of said transmitters in response to rotation of said drum, and said operating means comprising a motor, geared to said drum for rotating the latter and electrically connected to said second track of the tape; said second track being adapted to provide step operation of said motor and of said drum.

* * * * *